(12) United States Patent
Feris et al.

(10) Patent No.: US 8,170,276 B2
(45) Date of Patent: May 1, 2012

(54) OBJECT DETECTION SYSTEM BASED ON A POOL OF ADAPTIVE FEATURES

(75) Inventors: Rogerio S. Feris, White Plains, NY (US); Arun Hampapur, Norwalk, CT (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1388 days.

(21) Appl. No.: 11/688,372

(22) Filed: Mar. 20, 2007

(65) Prior Publication Data

US 2008/0232681 A1  Sep. 25, 2008

(51) Int. Cl.
*G06K 9/00* (2006.01)
(52) U.S. Cl. ........ 382/103; 382/159; 382/190; 382/192; 382/195; 382/224; 382/239; 382/249
(58) Field of Classification Search .................. 382/103, 382/159, 190, 192, 195, 224, 239, 249
See application file for complete search history.

(56) References Cited

U.S. PATENT DOCUMENTS

| | | | |
|---|---|---|---|
| 5,291,563 A | | 3/1994 | Maeda |
| 6,075,878 A | * | 6/2000 | Yoshida et al. ............... 382/132 |
| 6,078,680 A | * | 6/2000 | Yoshida et al. ............... 382/128 |
| 6,222,939 B1 | * | 4/2001 | Wiskott et al. ............... 382/209 |
| 6,278,793 B1 | * | 8/2001 | Gur et al. .................... 382/128 |
| 6,415,046 B1 | * | 7/2002 | Kerut, Sr. .................... 382/128 |
| 6,434,261 B1 | * | 8/2002 | Zhang et al. ................. 382/132 |
| 6,829,384 B2 | | 12/2004 | Schneiderman et al. |
| 2004/0022436 A1 | * | 2/2004 | Patti et al. .................... 382/191 |
| 2007/0009159 A1 | | 1/2007 | Fan |

OTHER PUBLICATIONS

Wang et al., "Learning Discriminant Features for Multi-View Face and Eye Detection," IEEE Computer Society Conference on Computer Vision and Pattern Recognition, Internet resource, Rensselaer Polytechnic Institute, Troy, New York, 2005, pp. 1-7.*
Elgammal et al., "Separating Style and Content on a Nonlinear Manifold," Department of Computer Science, Rutgers University, New Brunswick, New Jersey, CVPR 2004, pp. 1-8.
Friedman et al., "Additive Logistic Regression: a Statistical View of Boosting," Stanford, California, Aug. 20, 1998, pp. 1-45.
Huang et al., "Vector Boosting for Rotation Invariant Multi-View Face Detection," Computer Science and Technology Department, Tsinghua University, Sensing Technology Laboratory, Omron Corporation, Beijing, China, pp. 1-8.
Huang et al., "Learning Sparse Features in Granular Space for Multi-View Face Detection," Computer Science and Technology Department, Tsinghua University, Sensing Technology Laboratory, Omron Corporation, Beijing, China, pp. 1-6.

(Continued)

*Primary Examiner* — Brian Q Le
*Assistant Examiner* — Julian Brooks
(74) *Attorney, Agent, or Firm* — Anna L. Linne; Hoffman Warnick LLC

(57) ABSTRACT

A method, system and computer program product for detecting presence of an object in an image are disclosed. According to an embodiment, a method for detecting a presence of an object in an image comprises: receiving multiple training image samples; determining a set of adaptive features for each training image sample, the set of adaptive features matching the local structure of each training image sample; integrating the sets of adaptive features of the multiple training image samples to generate an adaptive feature pool; determining a general feature based on the adaptive feature pool; and examining the image using a classifier determined based on the general feature to detect the presence of the object.

20 Claims, 3 Drawing Sheets

OTHER PUBLICATIONS

Kölsch et al., "Robust Hand Detection," Department of Computer Science, University of California, Santa Barbara, California, pp. 1-6.
Krueger, "Gabor Wavelet Networks for Object Representation," Christian-Albrecht University, Kiel, Germany, 2001, pp. 1-156.
Levi et al., "Learning Object Detection from a Small Number of Examples: the Importance of Good Features," School of Computer Science and Engineering, The Hebrew University of Jerusalem, Jerusalem, Israel, pp. 1-8.
Lienhart et al., "Empirical Analysis of Detection Cascades of Boosted Classifiers for Rapid Object Detection," Microprocessor Research Lab, Intel Labs, Intel Corporation, Santa Clara, California, 2002, pp. 1-7.
Liu et al., "Kullback-Leibler Boosting," Microsoft Research Asia, pp. 1-8.
Munder et al., "An Experimental Study on Pedestrian Classification," IEEE Transactions on Pattern Analysis and Machine Intelligence, vol. 28, No. 11, Nov. 2006, pp. 1-6.
Rowley et al., "Neural Network-Based Face Detection," IEEE PAMI, Jan. 1998, pp. 1-28.
Schapire et al., "Improved Boosting Algorithms Using Confidence-rated Predictions," Machine Learning, 37(3): 297-336, 1999, pp. 1-40.
Schneiderman et al., "A Statistical Approach to 3D Object Detection Applied to Faces and Cars," Robotics Institute Carnegie Mellon University, Pittsburgh, PA, May 10, 2000, pp. 1-106.
Tenenbaum et al., "Separating Style and Content with Bilinear Models," Neural Computation, Massachusetts Institute of Technology, 2000, pp. 1247-1283.
Tian et al., "Robust and Efficient Foreground Analysis for Real-time Video Surveillance," IBM T. J. Watson Research Center, Yorktown Heights, New York, pp. 1-6.
Viola et al., "Rapid Object Detection using a Boosted Cascade of Simple Features," Accepted Conference on Computer Vision and Pattern Recognition, 2001, pp. 1-9.
Yang et al., "Face Recognition Using Ada-Boosted Gabor Features," Institute of Computing Technology of Chinese Academy Science, Microsoft Research Asia, Beijing, China, pp. 1-6.
Zhang et al., "Real-Time Face Detection Using Boosting in Hierarchical Feature Spaces," IDIAP Research Institute, Martigny, Switzerland, Microsoft Research Asia, Beijing, China, pp. 1-4.
Zhang, "Using Wavelet Network in Nonparametric Estimation," Irisa/Inria, Campus de Beaulieu, Rennes Cedex, France, May 26, 1994, pp. 1-32.
Wang et al., "Learning Discriminant Features for Multi-View Face and Eye Detection," IEEE Computer Society Conference on Computer Vision and Pattern Recognition, Internet resource, Rensselaer Polytechnic Institute, Troy, New York, 2005, pp. 1-7, page numbers in provided copy are different than in the listed citation.
Jianke Zhu et al., "Gabor Wavelets Transform and Extended Nearest Feature Space Classifier for Face Recognition", Image and Graphics, 2004, Proceedings of the 3rd International Conference on Image and Graphics, Hong Kong, China, Dec. 18-20, 2004, IEEE, pp. 246-249.
W J Jasper et al., "Texture Characterization and Defect Detection Using Adaptive Wavelets", Optical Engineering, Society of Photo-Optical Instructions Engineers, Bellingham, vol. 35, No. 11, Nov. 1, 1996, pp. 3140-3148.
PCT International Search Report.

* cited by examiner

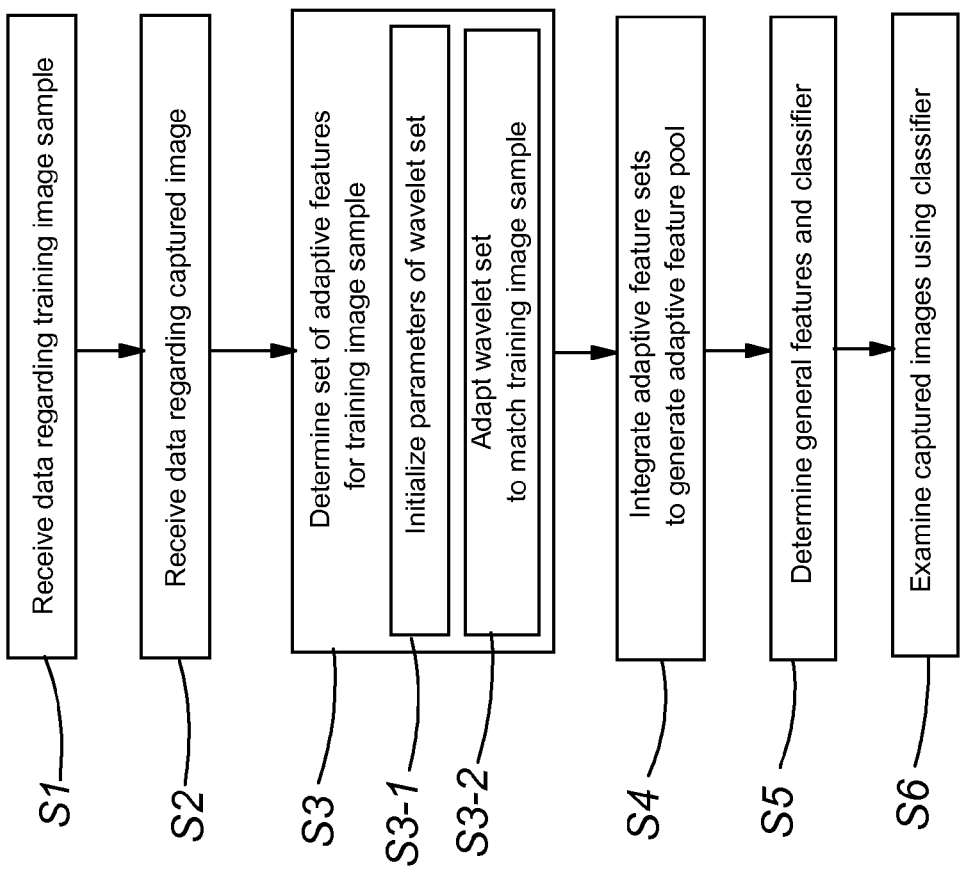

OBJECT DETECTION SYSTEM BASED ON A POOL OF ADAPTIVE FEATURES

FIELD OF THE INVENTION

The present disclosure relates in general to object detection, and more particularly to determining a classifier for object detection based on an adaptive feature pool.

BACKGROUND OF THE INVENTION

In the past few years, considerable progress has been made on learning-based methods for determining a classifier for object detection. In a learning based method, a set of training image samples, including object and non-object instances, are used to learn the classifier. A classifier uses a set of features to distinguish an object from a non-object. For example, Viola and Jones, *Rapid Object Detection Using a Boosted Cascade of Simple Features*, IEEE CONFERENCE ON COMPUTER VISION AND PATTERN RECOGNITION (CVPR'01), Kauai, Hi., December 2001, use Adaboost learning to select features and learn a classifier from a large pool of simple, computationally efficient features.

Following Viola and Jones, different extensions of the Viola and Jones method have been proposed, both on the learning algorithm level and on the feature level. For example, on the learning algorithm level, GentleBoost, Real Adaboost, and Vector Boosting algorithms have been proposed to replace the Adaboost algorithm of Viola and Jones. On the feature level, an extended set of Haar-like features, edge orientation histograms, and a sparse feature set have been proposed to be used to learn a classifier. In addition, Principal Component Analysis and Fisher Subspace Analysis have been used as part of the feature pool.

SUMMARY OF THE INVENTION

A first aspect of the invention is directed to a method for detecting a presence of an object in an image, the method comprising: receiving multiple training image samples; determining a set of adaptive features for each training image sample, the set of adaptive features matching the respective training image sample; integrating the sets of adaptive features of the multiple training image samples to generate an adaptive feature pool; determining a general feature based on the adaptive feature pool; and examining the image using a classifier determined based on the general feature to detect the presence of the object.

A second aspect of the invention is directed to a system for detecting a presence of an object in an image, the system comprising: means for obtaining multiple training image samples; means for determining a set of adaptive features for each training image sample, the set of adaptive features matching the respective training image sample; means for integrating the sets of adaptive features of the multiple training image samples to generate an adaptive feature pool; means for determining a general feature based on the adaptive feature pool; and means for examining the image using a classifier determined based on the general feature to detect the presence of the object.

A third aspect of the invention is directed to a computer program product for detecting a presence of an object in an image, comprising: computer usable program code which, when executed by a computer system, enables the computer system to: receive multiple training image samples; determine a set of adaptive features for each training image sample, the set of adaptive features matching the respective training image sample; integrate the sets of adaptive features of the multiple training image samples to generate a adaptive feature pool; determine a general feature based on the adaptive feature pool; and examine the image using a classifier determined based on the general feature to detect the presence of the object.

A fourth aspect of the invention is directed to a method for deploying a system for detecting a presence of an object in an image, comprising: providing a computer infrastructure being operable to: receive multiple training image samples; determine a set of adaptive features for each training image sample, the set of adaptive features matching the respective training image sample; integrate the sets of adaptive features of the multiple training image samples to generate a adaptive feature pool; determine a general feature based on the adaptive feature pool; and examine the image using a classifier determined based on the general feature to detect the presence of the object.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

The embodiments of this disclosure will be described in detail, with reference to the following figures, wherein like designations denote like elements, and wherein:

FIG. 3 shows an embodiment of the operation of an object detection system.

It is noted that the drawings of the disclosure are not to scale. The drawings are intended to depict only typical aspects of the disclosure, and therefore should not be considered as limiting the scope of the invention. In the drawings, like numbering represents like elements among the drawings.

DETAILED DESCRIPTION OF THE DISCLOSURE

The following detailed description of embodiments refers to the accompanying drawings, which illustrate specific embodiments of the disclosure. Other embodiments having different structures and operations do not depart from the scope of the present invention.

1. System Overview

Figure 1:
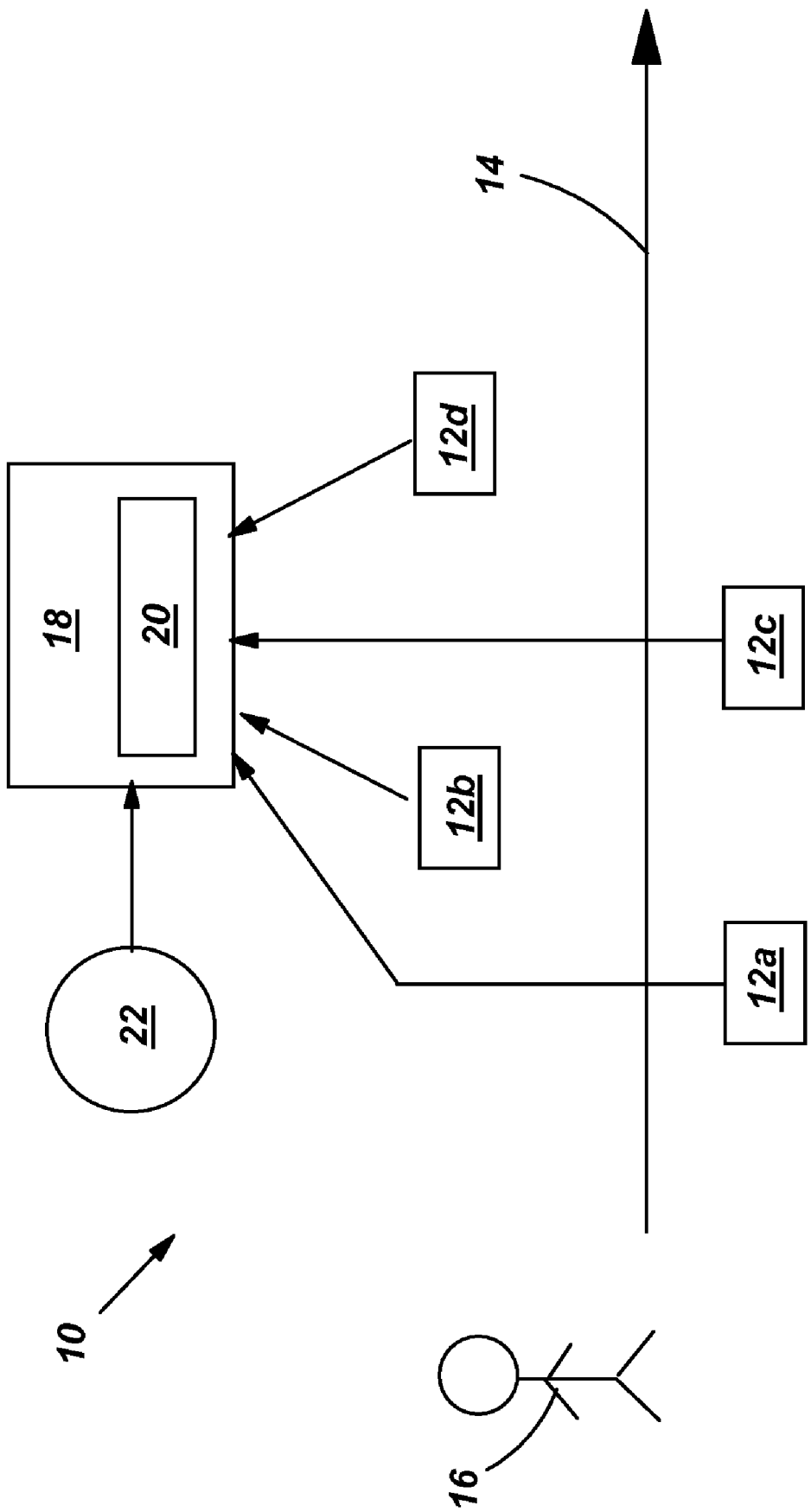
FIG. 1 shows a block diagram of a system according to an embodiment of the invention.

FIG. 1 shows a block diagram of a system 10 according to an embodiment. System 10 includes multiple image capturing devices (e.g., cameras) 12 (12*a*-12*d* are shown) positioned around a path 14 in a preset pattern. Specifically, cameras 12 are positioned in a sequence to capture different views of an actual three-dimension object 16 in path 14 in a sequence (the arrow of path 14 indicating a presumed direction of movement of actual object 16 in path 14). For example, camera 12*a* captures a frontal view of actual object 16; subsequent to 12*a*, camera 12*b* captures a side profile view of actual object 16; subsequent to 12*b*, camera 12*c* captures again a frontal view of actual object 16; and subsequent to 12*c*, camera 12*d* again captures a side profile view of actual object 16. The images captured by cameras 12 may be communicated to a processing center 18 to detect whether a target object is present in the images, e.g., processing center 18 determines whether actual object 16 is the target object. In processing the sequence of captured images of actual object 16, processing center 18 may use different classifiers to examine images of different views of actual object 16, each of the different classifiers identifying the target object in a different view. For example, a frontal view classifier may be used to examine images captured by cameras 12a and 12c and a side profile view identifier may be used to examine images captured by cameras 12b and 12d.

It should be appreciated that actual object 16 can be any object in path 14 and captured by a camera 12. For example, in the case that path 14 is a doorway monitored by surveillance cameras 12, actual object 16 may be an animal running through the doorway or may be a piece of luggage that is moved through the doorway, or may be the background of the doorway itself, i.e., no additional object except the doorway. A target object may be any object intended to be monitored. For example, target object can be a human-being in general, a human-being with a specific characteristic, e.g., a specific facial complexity, or an automatic weapon. In the following description, a human-being in general will be used as an illustrative example of a target object for descriptive purposes.

The classifiers used in the examination may be determined by a classifier selection unit 20 of processing center 18 based on training image samples 22 input thereto. Details of the selection of a classifier will be described herein together with a computer environment 100 (FIG. 2).

2. Computer Environment

Figure 2:
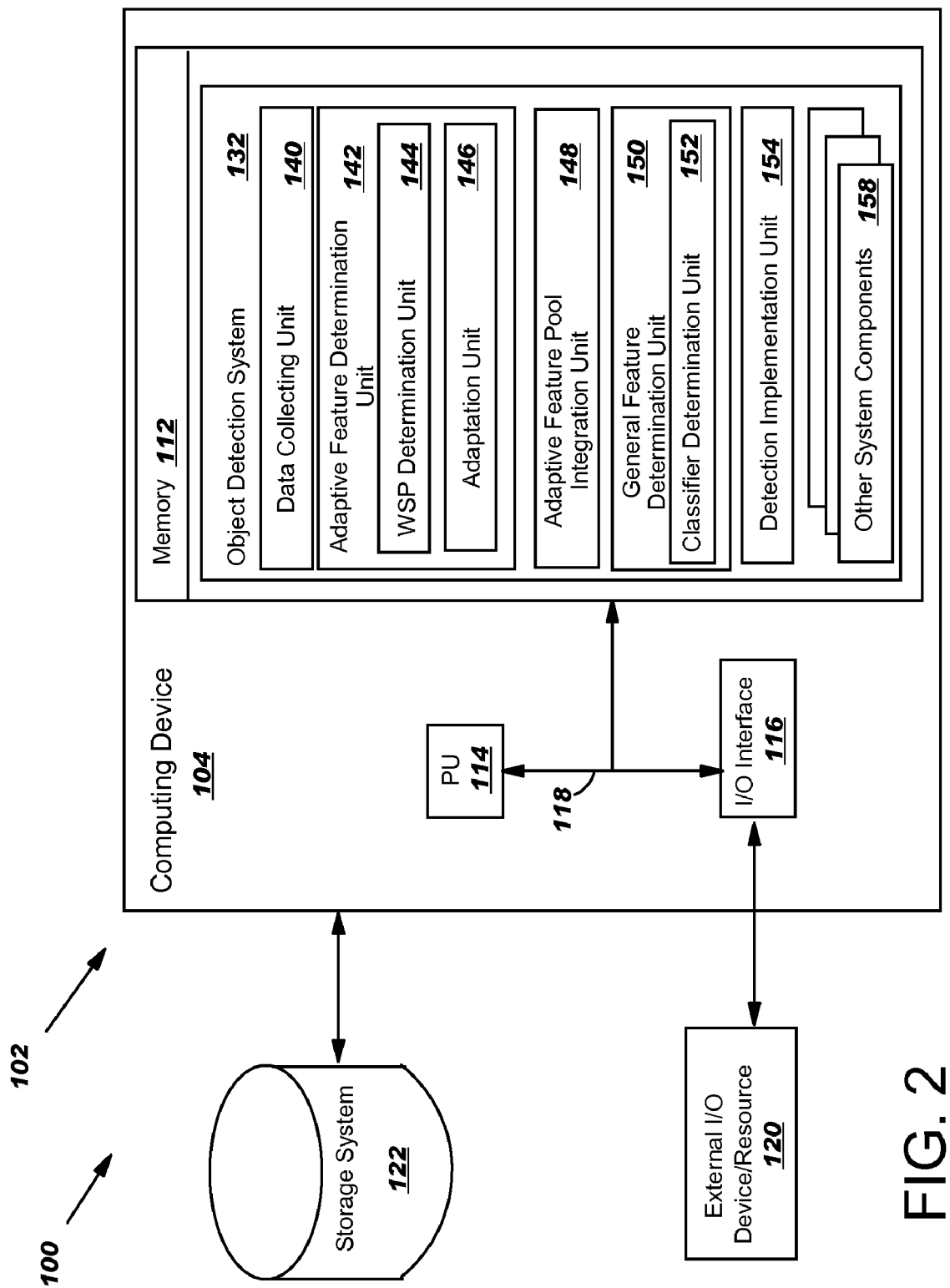
FIG. 2 shows a block diagram of an illustrative computer environment according to an embodiment of the invention.

FIG. 2 shows an illustrative environment 100 for detecting the presence of a target object in an image. To this extent, environment 100 includes a computer infrastructure 102 that can perform the various processes described herein for determining whether a target object, e.g., a human-being, is present in the images captured by cameras 12 (FIG. 1). In particular, computer infrastructure 102 is shown including a computing device 104 that comprises an object detection system 132, which enables computing device 104 to perform the process(es) described herein.

Computing device 104 is shown including a memory 112, a processing unit (PU) 114, an input/output (I/O) interface 116, and a bus 118. Further, computing device 104 is shown in communication with an external I/O device/resource 120 and a storage system 122. In general, PU 114 executes computer program code, such as object detection system 132, that is stored in memory 112 and/or storage system 122. While executing computer program code, PU 114 can read and/or write data to/from memory 112, storage system 122, and/or I/O interface 116. Bus 118 provides a communications link between each of the components in computing device 104. I/O interface 116 can comprise any device that enables a user to interact with computing device 104 or any device that enables computing device 104 to communicate with one or more other computing devices. External I/O device/resource 120 can be coupled to the system either directly or through I/O interface 116.

In any event, computing device 104 can comprise any general purpose computing article of manufacture capable of executing computer program code installed thereon. However, it is understood that computing device 104 and object detection system 132 are only representative of various possible equivalent computing devices that may perform the various processes of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in an embodiment, computer infrastructure 102 comprises two or more computing devices that communicate over any type of wired and/or wireless communications link, such as a network, a shared memory, or the like, to perform the various processes of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Object detection system 132 includes a data collecting unit 140; adaptive feature determination unit 142 including a wavelet set parameter (WSP) initialization unit 144 and an adaptation unit 146; an adaptive feature pool integration unit 148; a general feature determination unit 150 including a classifier determination unit 152; a detection implementation unit 154; and other system components 158. Other system components 158 may include any now known or later developed parts of object detection system 132 not individually delineated herein, but understood by those skilled in the art. As should be appreciated, components of computer infrastructure 102 and object detection system 132 may be located at different physical locations or at the same physical location.

According to an embodiment, computer infrastructure 102 and object detection system 132 may be used to implement, inter alia, processing center 18 of system 10 (FIG. 1). For example, adaptive feature determination unit 142, adaptive feature pool integration unit 148, and general feature determination unit 150 may be used together to implement classifier selection unit 20 (FIG. 1) of processing center 18.

Inputs/outputs to computer infrastructure 102, e.g., through external I/O device/resource 120 and/or I/O interface 116, may include images of actual object 16 captured by cameras 12 and training image samples 22 of a target object, e.g., a human-being. Training image samples of non-objects may also be required as is appreciated. In the following description, a training image sample 22 refers to a training image sample of the target object for description purposes. The teaching of the disclosure can also be applied to the processing of non-object training image sample. The operation of system 10 and object detection system 132 are described together herein in detail.

3. Operation Methodology

An embodiment of the operation of object detection system 132 is shown in the flow diagram of FIG. 3. Referring to FIGS. 1-3, in process S1, data collecting unit 140 receives data regarding training image samples 22. Training image samples 22 include sample images of different views of the target object, e.g., human-being. The following description focuses on the processing of training image samples 22 of a specific view, e.g., frontal view, of human-being for simplicity purposes, unless indicated otherwise. It should be appreciated that processing training image samples 22 of other views of the target object are also included, and preferably is implemented in the current invention. Each specific training image sample 22 represents a particular individual of the target object, e.g., a specific person.

In process S2, data collecting unit 140 receives/collects data regarding the images of actual object 16 captured by cameras 12. As described above, different cameras 12 capture different views of actual object 16.

In process S3, adaptive feature determination unit 142 determines a set of adaptive features for each training image sample 22 such that the set of adaptive features together match the respective training image sample 22. According to an embodiment, adaptive feature determination unit 142 adapts a set of wavelets to the training image sample to generate the adaptive feature set. Process S3 includes two sub-processes. In sub-process S3-1, wavelet set parameter (WSP) initialization unit 144 initializes parameters of the wavelet set ($\psi$) used to produce the set of adaptive features. $\psi=\{\psi_{n_1}\ldots\psi_{n_N}\}$, where $\psi_{n_i}$ (x, y) is a particular mother wavelet function with vector parameters $n_i=(c_x, c_y, \theta, s_x, s_y)^T$, where $c_x, c_y$ indicate the position of the wavelet, $\theta$ the orientation, and $s_x, s_y$ the scale of the wavelets. The wavelet set parameters may include number of wavelets (N), wavelet type, scale initialization, wavelet frequency, group of features treated as a single feature, and initial wavelet vector parameters ($n_i$), etc. The number of wavelets (N) indicates how many wavelet functions will be used to represent the training image sample. The choice of N is arbitrary and related to the degree of desired representation accuracy. Wavelet type indicates the type of wavelet function used to represent the training image sample. Any type of wavelet functions may be used, and all are included in the invention. According to an embodiment, preferably, Haar and/or Gabor wavelets are used. The scale initialization controls the initial scale of the wavelets. As mentioned before, wavelet vector parameters are defined as $n_i=(c_x, c_y, \theta, s_x, s_y)^T$, where $c_x, c_y$ denote position of the wavelet in x and y axis, $s_x, s_y$ denote scale of the wavelet in x and y axis, and $\theta$ denotes orientation of the wavelet. The frequency parameter controls the number of oscillations of the wavelet filter. WSP initialization unit 144 may select to treat a group of adaptive features as a single feature, which is important to encode global object information with the adaptive features.

According to an embodiment, the wavelet set parameters for the respective training image samples 22 are initialized/controlled to be diversified to achieve a desired diversity of adaptive features in an adaptive feature pool as will be described. For example, the wavelet sets for different training image samples 22 may be initialized with different wavelet parameters. One way to control the diversity is to randomly assign different wavelet set parameters for the wavelet sets of different training image samples 22. In addition, a user may instruct WSP determination unit 144 regarding how to assign wavelet set parameters for some specific training image samples 22, and/or all training image samples 22.

In sub-process S3-2, adaptation unit 146 adapts the wavelet set for each training image sample 22 such that the wavelets match one-to-one to the image structures of the respective training image sample 22. The goal of the adaptation is to learn the parameters of the wavelets $\psi_{n_i}$, e.g., position, scale, and orientation, so that they match the image structures of the training image sample 22. The following description focuses on the adaptation of a wavelet set for a specific training image sample 22 for simplicity purposes. The described process may be operated upon each and every training image samples 22 independently.

According to an embodiment, adaptation unit 146 first initializes the set of wavelets $\psi_{n_i}$ along training image sample 22 according to the parameters specified by WSP unit 144.

Subsequently, adaptation unit 146 optimizes wavelets $\psi_{n_i}$ to match the image structures of training image sample 22 by minimizing the error between the training image sample and the wavelets using the following equation:

$$E = \min_{n_i, w_i} \left\| I - \sum_i w_i \psi_{n_i} \right\|^2, \quad (1)$$

where E denotes an energy function, $\psi_{n_i}$ denotes a wavelet with wavelet vector parameters $n_i$, with $n_i=(c_x, c_y, \theta, s_x, s_y)^T$, where $c_x, c_y$ denote position of the wavelet in x and y axis, $s_x, s_y$ denote scale of the wavelet in x and y axis, and $\theta$ denotes orientation of the wavelet, $w_i$ denotes a weight of the wavelet, and I denotes the training image sample.

Using equation (1), wavelets $\psi_{n_i}$ vector parameters $n_i$ are optimized so that the training sample image 22 may be closely reconstructed by the optimized wavelets $\psi_{n_i}$ and weights $w_i$ using the following equation:

$$\hat{I} = \sum_{i=1}^{N} w_i \psi_{n_i}, \quad (2)$$

where N indicates the number of wavelets, $\psi_{n_i}$ indicates optimized wavelet i, and $w_i$ indicates the weight of optimized wavelet i.

Rather than relying on equation (1) above, adaptation unit 146 may directly compute wavelet weights $w_i$ once the wavelet vector parameters $n_i$ are optimized. If the wavelet functions $\psi_{n_i}$ are orthogonal, weights $w_i$ may be calculated as the inner product of training image sample 22 (I) with respective wavelet function $\psi_{n_i}$. That is:

$$w_i = \langle I, \psi_{n_i} \rangle \quad (3).$$

For more a general case where wavelet functions $\psi_{n_i}$ may not be orthogonal, adaptation unit 146 may construct a family of dual wavelets $\tilde{\psi}=\{\tilde{\psi}_{n_1}\ldots\tilde{\psi}_{n_N}\}$. Wavelet $\tilde{\psi}_{n_i}$ is dual wavelet of $\psi_{n_i}$ if the bi-orthogonality condition is satisfied, i.e., $\langle \tilde{\psi}_{n_i}, \psi_{n_j} \rangle = \delta_{i,j}$, where $\delta_{i,j}$ is the Kronecker delta function. As such:

$$\tilde{\psi}_{n_i} = \sum_j (A^{-1})_{i,j} \psi_{n_j}, \text{ where} \quad (4)$$

$$A_{i,j} = \langle \psi_{n_i}, \psi_{n_j} \rangle \quad (5)$$

Then, weights $w_i$ may be calculated using the following equation:

$$w_i = \langle I, \tilde{\psi}_{n_i} \rangle \quad (6)$$

where I is the training image sample 22.

In process S3, after the wavelets are optimized to match the training image sample 22, the optimized wavelets $\psi_{n_i}$ are referred to as "adaptive features" for illustrative purposes.

In process S4, adaptive feature pool integration unit 148 integrates the sets of adaptive features for all training image samples 22 to generate an adaptive feature pool. Specifically, according to an embodiment, adaptive feature pool integration unit 148 puts all the adaptive features for all the training image samples 22 into a single pool of adaptive features (Ω) defined as:

$$\Omega = \bigcup_{i=1}^{M} \psi_i, \quad (7)$$

where $\psi_i$ indicates a set of adaptive features i, and M indicates a total number of training samples 22.

As described above, adaptive features in the adaptive features pool are diversified because parameters of the wavelet sets for determining the adaptive features of different training image samples 22 are diversified. For example, Haar adaptive features may be used to reconstruct a training image sample 22, while Gabor adaptive features may be used to reconstruct another training image sample 22.

In process S5, general feature determination unit 150 determines general features based on the adaptive feature pool (Ω). A general feature(s) is the feature(s) from the adaptive feature pool that encodes common characteristics of all training image samples 22. In addition, classifier determination unit 152 further determines a classifier based on the general features, which is to be used to detect whether a target object is present in the images captured by cameras 12. Any method may be used to determine general features and/or a classifier and all are included in the invention. For example, Adaboost learning of Viola and Jones may be used to select general features and classifiers. According to an embodiment, multiple general features and classifiers may be determined based on different views of training image samples 22 for identifying different views of training image samples 22.

In process S6, detection implementation unit 154 examines the images captured by cameras 12 to detect whether a target object is present in the images. According to an embodiment, detection implementation unit 154 uses different classifiers to examine the respective views of actual object 16. For example, a side profile view classifier (to identify a side profile view of the target object) will be used to examine the images captured by cameras 12*b* and 12*d*; and a frontal view classifier (to identify a frontal view of the target object) will be used to examine the images captured by cameras 12*a* and 12*c*.

4. Conclusion

While shown and described herein as a method and system for detecting presence of an object in an image, it is understood that the disclosure further provides various alternative embodiments. For example, in an embodiment, the invention provides a program product stored on a computer-readable medium, which when executed, enables a computer infrastructure to detect presence of an object in an image. To this extent, the computer-readable medium includes program code, such as object detection system 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 2) and/or storage system 122 (FIG. 2), and/or as a data signal traveling over a network (e.g., during a wired/wireless electronic distribution of the program product).

It should be appreciated that the teachings of the present invention could be offered as a business method on a subscription or fee basis. For example, a system 10 (FIG. 1), a computing device 104 comprising object detection system 132 (FIG. 2) could be created, maintained and/or deployed by a service provider that offers the functions described herein for customers. That is, a service provider could offer to provide a service to encourage a virtual world user to perform a conduct as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for detecting a presence of an object in an image, the method comprising:
   receiving multiple training image samples;
   using at least one computing device to determine a set of adaptive features for each training image sample, wherein the determining includes:
   adapting a set of wavelets to match one-by-one to image structures of the respective training image sample, wherein the adapting is implemented approximately using formula:

$$E = \min_{n_i, w_i} \left\| I - \sum_i w_i \psi_{n_i} \right\|^2$$

where E denotes an energy function, $\psi_{n_i}$ denotes a wavelet with a wavelet vector parameter with $n_i$, with $n_i = (c_x, c_y, \vartheta, s_x, s_y)^T$, where $c_x, c_y$ denote position of the wavelet in x and y axis, $s_x, s_y$ denote scale of the wavelet in x and y axis, and $\vartheta$ denotes orientation of the wavelet, $w_i$ denotes a weight of the wavelet, and I denotes the training image sample;
   using at least one computing device to integrate the sets of adaptive features of the multiple training image samples to generate an adaptive feature pool;
   using at least one computing device to determine a general feature based on the adaptive feature pool; and
   using at least one computing device to examine the image using a classifier determined based on the general feature to detect the presence of the object.

2. The method of claim 1, wherein the set of wavelets are initialized to have parameters of at least one of: number of wavelets, wavelet type, scale initialization, wavelet frequency, and group of features treated as a single feature.

3. The method of claim 2, wherein the parameters of the sets of wavelets for the respective multiple training image samples are initialized to be diversified to diversify the adaptive features in the adaptive feature pool.

4. The method of claim 1, wherein the general feature is learned from the adaptive features of the multiple training image samples.

5. The method of claim 1, further comprising examining a sequence of images to detect a presence of a moving three-dimension object, multiple different classifiers being used sequentially in examining the sequence of images, wherein each of the multiple different classifiers identifying the three-dimension object in a different view.

6. A system comprising:
   a computer system, including at least one computing device, for performing a method for detecting a presence of an object in an image, the method comprising:
   obtaining multiple training image samples;
   determining a set of adaptive features for each training image sample, wherein the determining includes:
   adapting a set of wavelets to match one-by-one to image structures of the respective training image sample, wherein the adapting is implemented approximately using formula:

$$E = \min_{n_i, w_i} \left\| I - \sum_i w_i \psi_{n_i} \right\|^2$$

where E denotes an energy function, $\psi_{n_i}$ denotes a wavelet with a wavelet vector parameter $n_i$, with $n_i = (c_x, c_y, \vartheta, s_x, s_y)^T$, where $c_x, c_y$ denote position of the wavelet in x and y axis, $s_x, s_y$ denote scale of the wavelet in x and y axis, and $\vartheta$ denotes orientation of the wavelet, $w_i$ denotes a weight of the wavelet, and I denotes the training image sample;
   integrating the sets of adaptive features of the multiple training image samples to generate an adaptive feature pool;
   determining a general feature based on the adaptive feature pool; and
   examining the image using a classifier determined based on the general feature to detect the presence of the object.

7. The system of claim 6, wherein the set of wavelets are initialized to have parameters of at least one of: number of wavelets, wavelet type, scale initialization, wavelet frequency, and group of features treated as a single feature.

8. The system of claim 7, wherein the initializing includes initializing the parameters of the sets of wavelets for the respective multiple training image samples to be diversified to diversify the adaptive features in the adaptive feature pool.

9. The system of claim 6, wherein the general feature determining includes learning the general feature from the adaptive features of the multiple training image samples.

10. The system of claim 6, wherein the examining includes examining a sequence of images to detect a presence of a moving three-dimension object using multiple different classifiers sequentially, wherein each of the multiple different classifiers identifying the three-dimension object in a different view.

11. A computer program product comprising program code embodied in at least one non-transitory computer-readable medium, which when executed, enables a computer system to implement a method for detecting a presence of an object in an image, the method comprising:
    receiving multiple training image samples;
    determining a set of adaptive features for each training image sample, wherein the determining includes:
    adapting a set of wavelets to match one-by-one to image structures of the respective training image sample, wherein the adapting is implemented approximately using formula:

$$E = \min_{n_i, w_i} \left\| I - \sum_i w_i \psi_{n_i} \right\|^2$$

where E denotes an enerqy function, $\psi_{n_i}$ denotes a wavelet with a wavelet vector parameter $n_i$, with $n_i = (c_x, c_y, \vartheta, s_x, s_y)^T$, where $c_x, c_y$ denote position of the wavelet in x and y axis, $s_x, s_y$ denote scale of the wavelet in x and y axis, and $\vartheta$ denotes orientation of the wavelet, $w_i$ denotes a weight of the wavelet, and I denotes the training image sample;
    integrating the sets of adaptive features of the multiple training image samples to generate an adaptive feature pool;
    determining a general feature based on the adaptive feature pool; and
    examining the image using a classifier determined based on the general feature to detect the presence of the object.

12. The program product of claim 11, wherein the set of wavelets are initialized to have parameters of at least one of:

number of wavelets, wavelet type, scale initialization, wavelet frequency, and group of features treated as a single feature.

13. The program product of claim 12, wherein the program code is further configured to enable the computer system to initialize the parameters of the sets of wavelets for the respective multiple training image samples to be diversified to diversify the adaptive features in the adaptive feature pool.

14. The program product of claim 11, wherein the program code is configured to enable the computer system to learn the general feature from the adaptive features of the multiple training image samples.

15. The program product of claim 11, wherein the program code is further configured to enable the computer system to examine a sequence of images to detect a presence of a moving three-dimension object using multiple different classifiers sequentially, wherein each of the multiple different classifiers identifying the three-dimension object in a different view.

16. A method for deploying a system for detecting a presence of an object in an image, comprising:
configuring a computer infrastructure, including at least one computing device, to be operable to:
receive multiple training image samples;
determine a set of adaptive features for each training image sample, wherein the determining includes:
adapting a set of wavelets to match one-by-one to image structures of the respective training image sample, wherein the adapting is implemented approximately using formula:

$$E = \min_{n_i, w_i} \left\| I - \sum_i w_i \psi_{n_i} \right\|^2$$

where E denotes an enerqy function, $\psi_{n_i}$ denotes a wavelet with a wavelet vector parameter $n_i$, with $n_i = (c_x, c_y, \vartheta, s_x, s_y)^T$, where $c_x, c_y$ denote position of the wavelet in x and y axis, $s_x, s_y$ denote scale of the wavelet in x and y axis, and $\vartheta$ denotes orientation of the wavelet, $w_i$ denotes a weight of the wavelet, and I denotes the training image sample;
integrate the sets of adaptive features of the multiple training image samples to generate an adaptive feature pool;
determine a general feature based on the adaptive feature pool; and
examine the image using a classifier determined based on the general feature to detect the presence of the object; and
configuring at least one computing device in the system with the computer program product.

17. The method of claim 16, wherein the set of wavelets are initialized to have parameters of at least one of: number of wavelets, wavelet type, scale initialization, wavelet frequency, and group of features treated as a single feature.

18. The method of claim 17, wherein the computer program product further makes the computer system operable to initialize the parameters of the sets of wavelets for the respective multiple training image samples to be diversified to diversify the adaptive features in the adaptive feature pool.

19. The method of claim 16, wherein the computer program product further makes the computer system operable to learn the general feature from the adaptive features of the multiple training image samples.

20. The method of claim 16, wherein the computer program product further makes the computer system operable to examine a sequence of images to detect a presence of a moving three-dimension object using multiple different classifiers sequentially, wherein each of the multiple different classifiers identifying the three-dimension object in a different view.

* * * * *